US009196076B1

(12) United States Patent
MacLeod

(10) Patent No.: US 9,196,076 B1
(45) Date of Patent: Nov. 24, 2015

(54) METHOD FOR PRODUCING TWO-DIMENSIONAL ANIMATED CHARACTERS

(76) Inventor: David MacLeod, Oakland, CA (US)

(*) Notice: Subject to any disclaimer, the term of this patent is extended or adjusted under 35 U.S.C. 154(b) by 451 days.

(21) Appl. No.: 13/297,751

(22) Filed: Nov. 16, 2011

Related U.S. Application Data

(60) Provisional application No. 61/414,768, filed on Nov. 17, 2010.

(51) Int. Cl.
*G06T 15/10* (2011.01)
*G06T 13/80* (2011.01)

(52) U.S. Cl.
CPC ....................................... *G06T 13/80* (2013.01)

(58) Field of Classification Search
CPC ................................ G06T 15/20; G06T 19/00
USPC .......................................................... 345/427
See application file for complete search history.

(56) References Cited

U.S. PATENT DOCUMENTS

| 7,423,650 | B2 | 9/2008 | Lee | |
|---|---|---|---|---|
| 2007/0115289 | A1* | 5/2007 | Goldfarb | 345/473 |
| 2007/0285419 | A1* | 12/2007 | Givon | 345/420 |
| 2009/0251462 | A1* | 10/2009 | Kaytis et al. | 345/419 |
| 2012/0229449 | A1* | 9/2012 | Psistakis et al. | 345/419 |

OTHER PUBLICATIONS

Di Fiore, F.; Schaeken, P.; Elens, K.; and Van Reeth, F., 2001. Automatic in-betweening in computer assisted animation by exploiting 2.5D modelling techniques. In Proceedings of Computer Animation 2001, 192-200.*
Bouvier-Zappa, S., Ostromoukhov, V., and Poulin, P. 2007. Motion cues for illustration of skeletal motion capture data. In Non-Photorealistic Animation and Rendering 2007.*
Teng Yingyan ,Zheng Jun-sheng, Gao Zhijun, "Design and Implementation of Interactive 3D Scenes Based on Virtools", Computer Science-Technology and Applications, 2009. IFCSTA '09. International Forum on (vol. 2 ), Dec. 27-29, 2009, p. 87-89.*

* cited by examiner

*Primary Examiner* — Javid A Amini
*Assistant Examiner* — Jin Ge

(57) ABSTRACT

A method for producing a two-dimensional (2D) animated character sequence is provided. The method includes producing a set of 2D drawings that represent one or more views of the body parts of the character being represented, analyzing an animated sequence of a three-dimensional (3D) armature in order to determine the motion of an animated character in 3D space over time, using a selection operation to determine which particular view of each body part to use to best represent that body part at any particular moment in time in the animated sequence, performing a projection operation for each bone of the armature in order to determine where, on a 2D plane, the selected drawing should be placed in a 2D animation frame, and assembling the selected body part drawings in order to produce the frames of a 2D animated character.

14 Claims, 14 Drawing Sheets

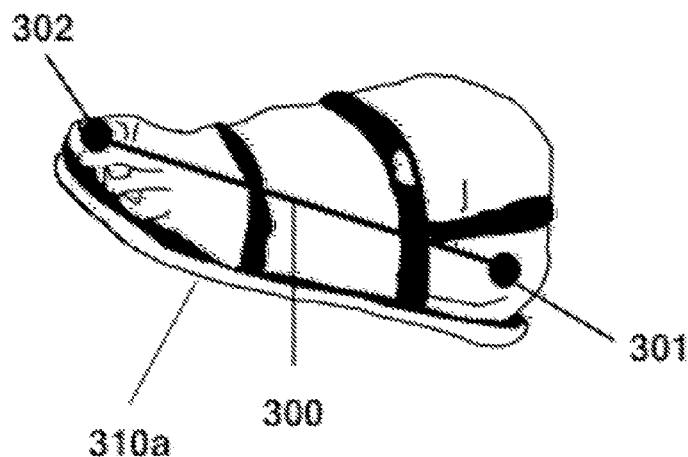
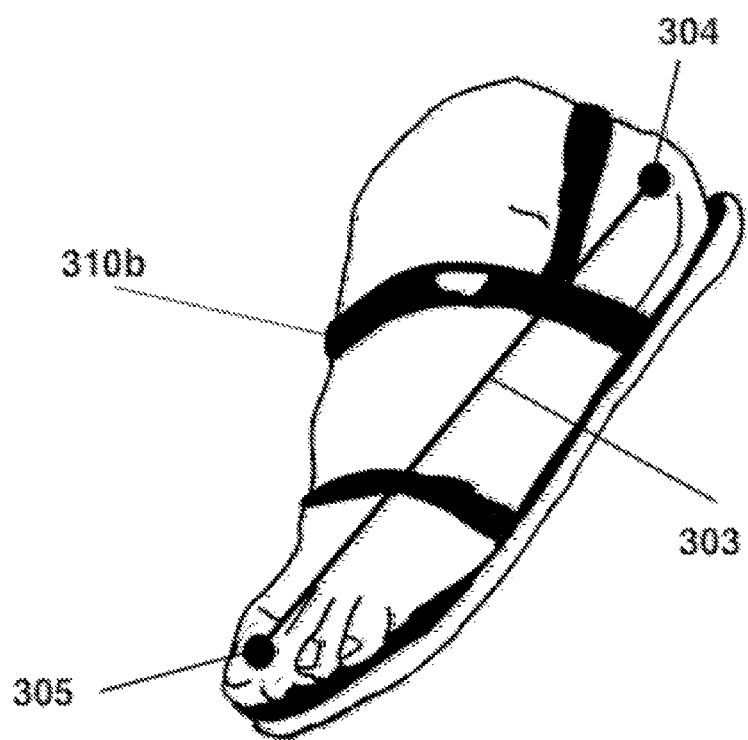
Fig. 5

METHOD FOR PRODUCING TWO-DIMENSIONAL ANIMATED CHARACTERS

CROSS-REFERENCE TO RELATED APPLICATIONS

This application claims the benefit of provisional patent application Ser. No. 61/414,768, filed 2010 Nov. 17 by the present inventor.

BACKGROUND

1. Prior Art

The following is a tabulation of some prior art that presently appears relevant:

U. S. patents

| Pat. No. | Issue Date | Patentee |
|---|---|---|
| 7423650 | Sep. 9, 2008 | Lee et al. |

2. Description of the Related Art

In the animation industry today, there are currently two general methods of producing animation: the 2D method, and the 3D method. Animation created using the 2D method is often referred to as 2D animation. Animation created using the 3D method is often referred to as 3D animation.

Using the 2D method, an artist creates 2D characters to be animated by producing two-dimensional drawings, or art assets, using a flat medium. This flat medium could be paper, or an acetate animation cell, or two-dimensional drawing software such as Adobe Illustrator or Adobe's CS5 Flash authoring tool. Using the 3D method, an artist creates 3D characters to be animated by producing numerical models that define an armature or skeleton for a character and the geometry of the character using a three-dimensional coordinate system. 3D character definitions are typically created using three-dimensional modeling software tools such as Autodesk's Maya or 3ds Max, and are typically stored as digital files in a computer memory.

When animation is created using a computer, whether using the 2D or 3D methods, animators typically produce character animation sequences using a process called key framing. In the key framing process, animators use software to create key frames that define the position and orientation of various body parts of the character to be animated at various points in time. In an animated sequence that runs at a rate of 24 frames per second for 72 frames, for example, an animator might create one key frame on the first frame in order to define the position and orientation of the character's various body parts at the start of the sequence, another key frame at the 12$^{th}$ frame in order to define the position and orientation of the character's various body parts one half-second into the animation sequence, and so on, until the motion for the character for the entire 72 frames of the sequence has been defined.

Once the key frames for an animation sequence have been defined, the software that produces the final animation uses a process called in-betweening to determine the position and orientation of each body part in all the frames of the animation by interpolating between the body part positioning and orientation defined in the key frames. In this way, the software produces the continuous motion of the animated character.

The process of key framing is similar for 2D animation and 3D animation, however, in 2D animation, positioning and orientation of 2D drawings are defined using a two-dimensional coordinate system, whereas in 3D animation, positioning and orientation of three-dimensional armatures are defined using a three-dimensional coordinate system, with an additional depth, or "z" coordinate added.

Both the 2D and 3D animation methods are commonly used in commercial animation ventures such as television programs, movies and video games. Each method has certain advantages and is appropriate for certain types of applications. However, the results of each method are very different in their appearance.

But although the 2D animation method produces results that have an appearance that is often desirable for animation customers and animation producers, the process of producing 3D animation has several distinct advantages over the process of producing 2D animation in terms of the ease of production and the quality of results:

One advantage that the 3D animation method has over the 2D animation method is that it can be used to easily create animation sequences that can depict an animated character from any number of different angles or vantage points. 2D animation methods typically involve creating animation sequences that show an animated character from one particular vantage point or view angle. For example, a 2D animation producer might produce an animation that depicts a character that is running in a specific direction. If the animation producer then also wished to show the same character running as seen from a different vantage point or orientation, then he or she would have to produce a second set of drawings and a second animation sequence depicting the action as seen by the second view. Likewise, any additional desired angles would require additional art and animation sequences to be produced.

The 3D animation method, by contrast, produces a single animation sequence that is not associated with any particular viewing angle or vantage point. By defining and moving a virtual camera in three-dimensional space, 3D animation software can use this single animation sequence to produce a character animation that shows the character as seen from any particular viewing angle or vantage point.

A second benefit of the 3D animation method over the 2D animation method is that with the 3D animation method, the character that is being animated, as defined by the 3D numerical model as described above, is usually defined distinctly and separately from the sequence of movements that are applied to that model in an animation sequence. In 3D animation, a single key frame-defined animated sequence can be applied to any character, or model. This means that if an artist has defined two different models representing two different characters, that the same key frame-defined sequence could be applied to either model, and an animation of either character performing the same animation motion could be produced using one single animation sequence.

In 2D animation, by contrast, the animation sequence, which defines the way the character moves, is typically not separable from the graphical visual information which defines the way the character looks, as implemented by the 2D drawings as stated above. Typically, in 2D animation, therefore, each character must be animated separately.

A third benefit of the 3D animation method over the 2D animation method is that it is often possible for an animator of a certain level of skill to produce results that are superior in terms of the realism and accuracy of movement using the 3D method as opposed to the 2D method. If, for example, an animator is animating a character that is running towards the camera, then a considerable amount of foreshortening of the limbs will be in evidence at various points throughout the animation cycle. Using the 2D animation method, considerations of the foreshortening and occlusion of the limbs of the character at any given moment in time must be estimated by the artist in a process that requires a considerable amount of judgment and skill in order for the results to be completed effectively. Using the 3D method, by contrast, in which limbs are positioned and oriented in three-dimensional space, foreshortening of the limbs and the occlusion of some limbs by other limbs at various points in time within the animation cycle are precisely determined by the rendering software, and the result is a mathematically accurate depiction of the character as rendered from a specific vantage point at a specific point in time. Animation sequences created by animators using the 3D method often have a more naturalistic and realistic appearance than animation sequences produced by animators of comparable skill using the 2D method.

Because of the above stated advantages of the 3D animation method, it is desirable for animation producers to be able to create 2D animation sequences in a way that utilizes and exploits the benefits of 3D technology, while at the same time, producing an animation where the end results have the appearance of 2D animated scenes in which animated characters are visually defined using 2D drawings rather than 3D numerical models, but where the movement is defined using the advantageous 3D method.

In U.S. Pat. No. 7,423,650, (2008), Lee et al. propose a method of representing and animating a two-dimensional humanoid character in three-dimensional space. This method attempts to leverage some of the advantages of the 3D method described above in order to produce a 2D animation by using "a method that can represent a 2D humanoid character according to views of the humanoid character taken by a camera in a 3D space and animates the 2D humanoid character according to a procedure of a 3D animation." However, the method described has a number of deficiencies and drawbacks.

The method described by Lee et al. claims a preprocessing operation, which includes a motion database setup operation that involves "analyzing a 3D character animation of the 3D humanoid character, extracting mapping information that maps the 3D character animation into a 2D character animation, and storing the mapping information in a motion database." This preprocessing operation presents a number of disadvantages: The first disadvantage is that the method requires that a set of finite pre-determined virtual camera angles or views be used in order to compute and populate the motion database. This results in limiting implementations of the method to only be able to produce 2D character animation sequences based on these pre-determined camera angles. This limitation would pose a disadvantage in real-time implementations such as video games, where user control over animated characters necessitates the ability to render animated characters from arbitrary and unpredictable angles in order to create a continuous and believable experience.

A second disadvantage of this preprocessing operation is that it would produce significantly large data sets, and would require access to the database for access to these data set in order for implementations to function. This would limit the usefulness of some implementations, such as online video gaming or virtual reality implementations, due to data transmission requirements.

The method described by Lee et al. also fails to describe a selection operation which selects from among a set of views of any particular body part on a frame-by-frame basis in order to produce an optimally continuous 2D animated sequence. To illustrate, FIG. 1 shows a number of views of a human head, a front view 200*a*, right ¾front view 200*b*, right side view 200*c*, right ¾back view 200*d*, back view 200*e*, right ¾left view 200*f*, left side view 200*g*, left ¾front view 200*h*, and top view 200*i*. If a 3D animated sequence contained one key frame in which the head of the character were positioned, relative to a specific virtual camera in 3D space, so that the view of the head were best represented by the right side view 200*c*, and a second key frame some number of frames later where the head of the character where positioned so that the view of the head were best represented by the left side view 200*g*, then the most optimal implementation would provide a selection operation that operates between key frames that would cause the representation of the head to smoothly migrate over time over adjacent representations of the head between the key frames. To illustrate given the example above, the head might be represented by the right side view 200*c* in one frame of the animation sequence, then by the right ¾back view 200*d* at a subsequent frame, then by the back view 200*e* at a further subsequent frame, then by the right ¾left view 200*f* at a further subsequent frame, and finally, the left side view 200*g* as the sequence progresses toward the second key frame. The method described by Lee et. al does not describe or teach this frame-by-frame selection process, but, rather, describes a process in which art assets are selected on a per key-frame basis. Given the example above, this would cause the situation where the head, which was represented by right side view 200*c* in one frame, would in a later frame, be represented by the left side view 200*g*, and because these two views are not visually adjacent, it would cause the animation to have a jerky and discontinuous appearance.

SUMMARY

The present invention is directed to a system and method for producing a 2D animated character sequence in a process comprised of the following operations:

a. An asset creation operation in which and artist or animation producer produces two-dimensional drawings or art assets that represent the body parts of the character being represented. For each body part being represented, one or more views of that body part are created that represent the body part as seen by one or more different viewing angles.

b. A production operation in which the final 2D animated character sequence is produced. This operation involves analyzing an animated sequence of a three-dimensional armature in order to determine the motion of an animated character in 3D space over time, and, using a specific view or virtual camera in 3D space:

a. Using a selection operation to determine, given the orientation in 3D space of any particular body part of the 3D armature being animated relative to the virtual camera at any particular time, which particular view of that particular body part to use to best represent the body part at that particular moment in time in the animated sequence.

b. Performing a 3D perspective projection operation for each bone of the 3D character armature in order to determine where, on a 2D plane, the two-dimensional drawing representing that bone in the resulting 2D animation should be placed at various points in time throughout the animated sequence.

c. For every frame in the animated sequence, assembling and arranging the selected body part drawings in order to produce the frames of the final 2D animated character.

DRAWINGS

Figures

FIG. 5 shows how a drawing representing the view of a body part of a 2D character is placed, scaled, and rotated based on the position of the 2D planar parts shown in FIG. 4.

FIG. 7A, FIG. 7B, FIG. 8A, and FIG. 8B show how different drawings representing views of the head of a 2D character are selected depending on the orientation of the head bone of a 3D armature in 3D space.

Figure 9:
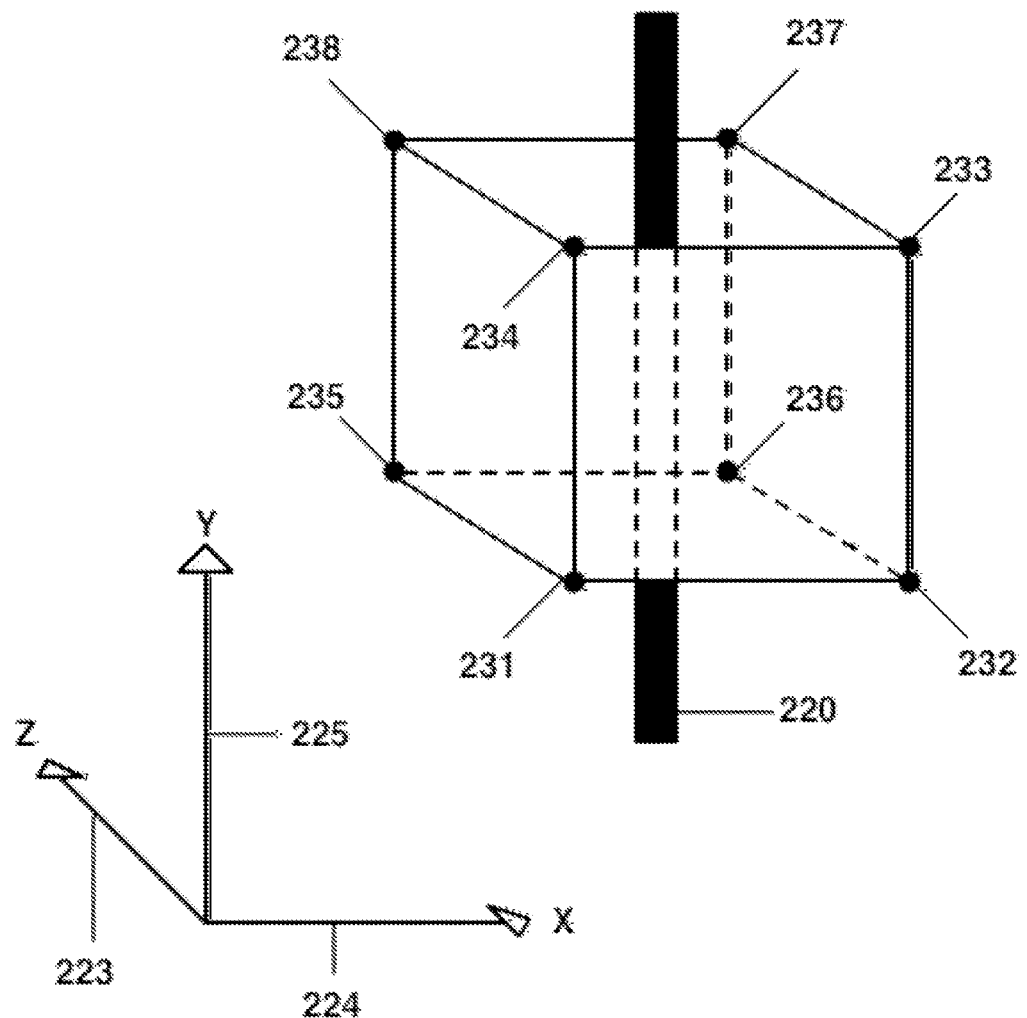

FIG. 9 shows how control points, which guide the selection operation in one embodiment, are placed around a bone in a 3D armature.

Figure 10:
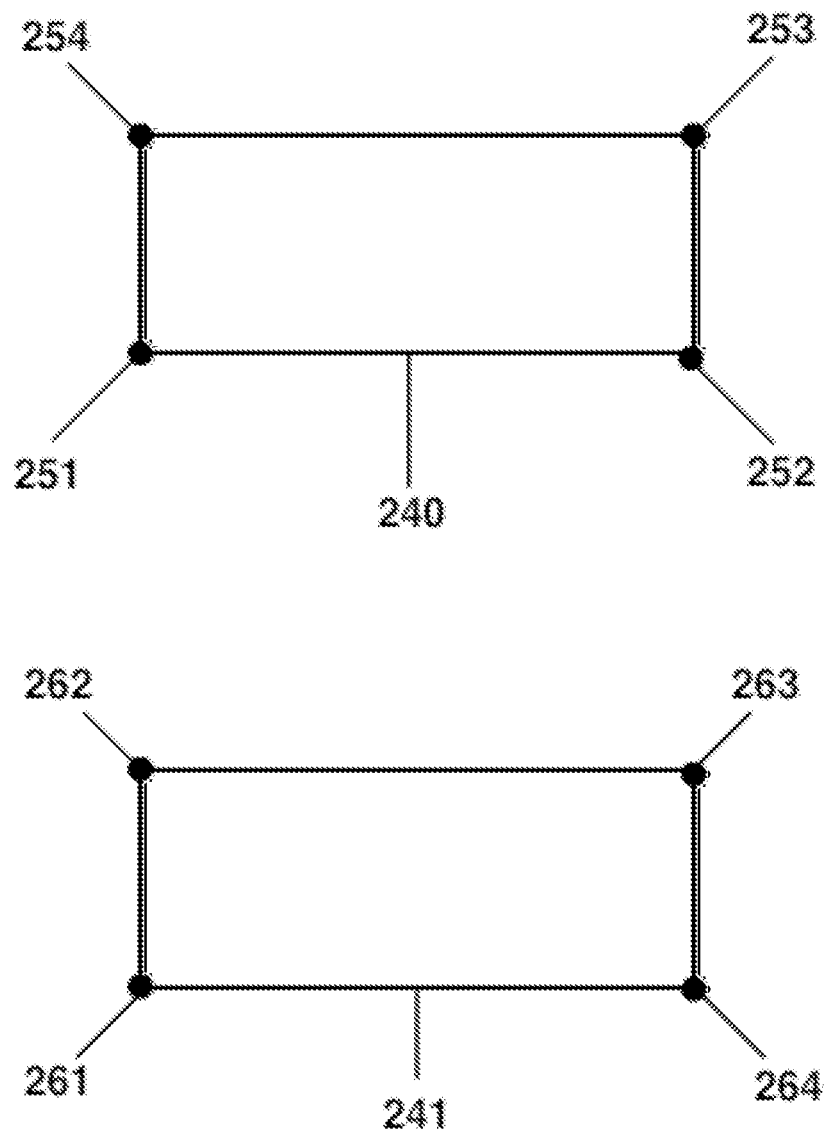

FIG. 10 shows the difference between counter-clockwise and clockwise winding in a polygon.

Figure 11:
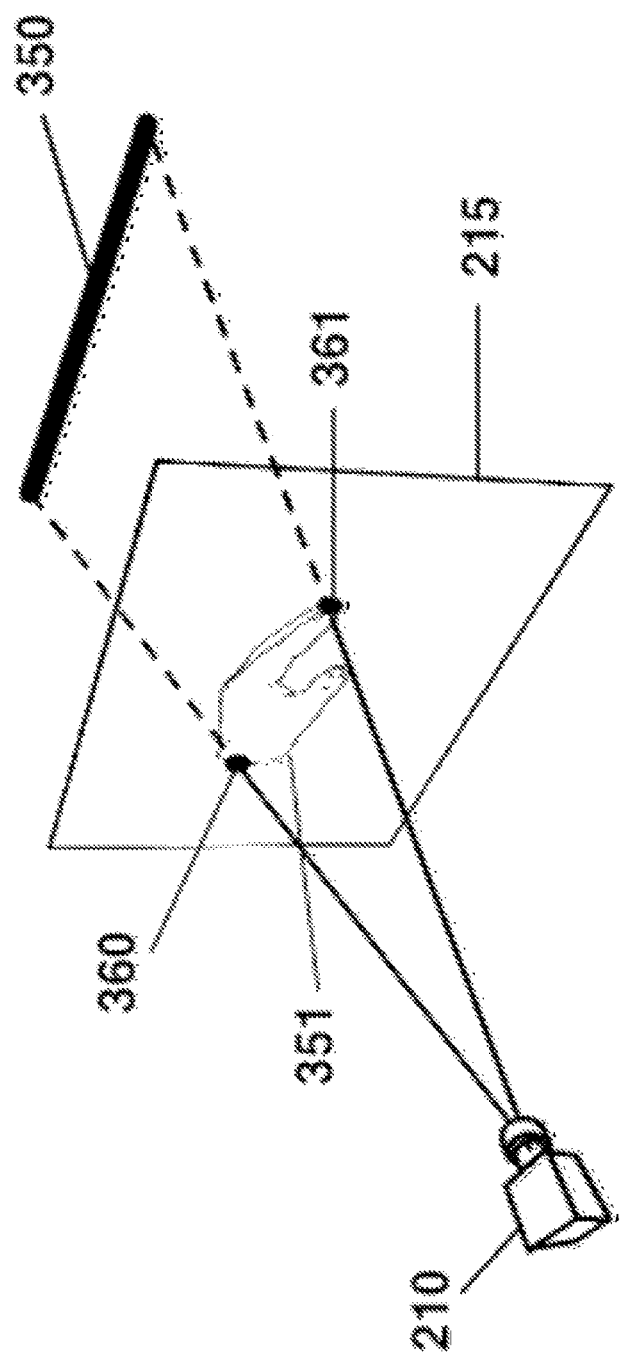

FIG. 11 shows how a drawing representing a view of the hand of a 2D character is placed on a 2D plane based on the position of a 3D hand bone in 3D space.

Figure 12:
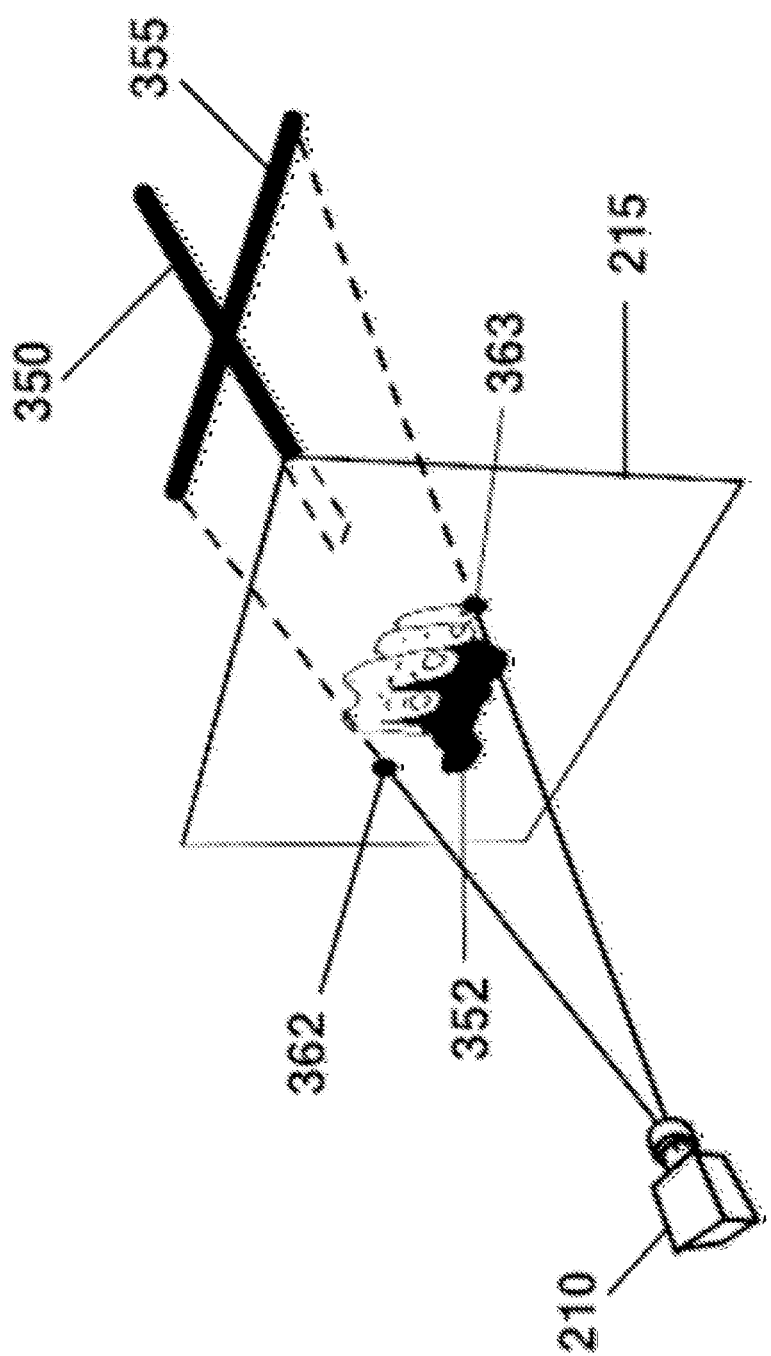

FIG. 12 shows how a drawing representing a different view of the hand of a 2D character is placed on a 2D plane based on the position of a second 3D bone perpendicular to the primary 3D hand bone in 3D space.

Figure 13:
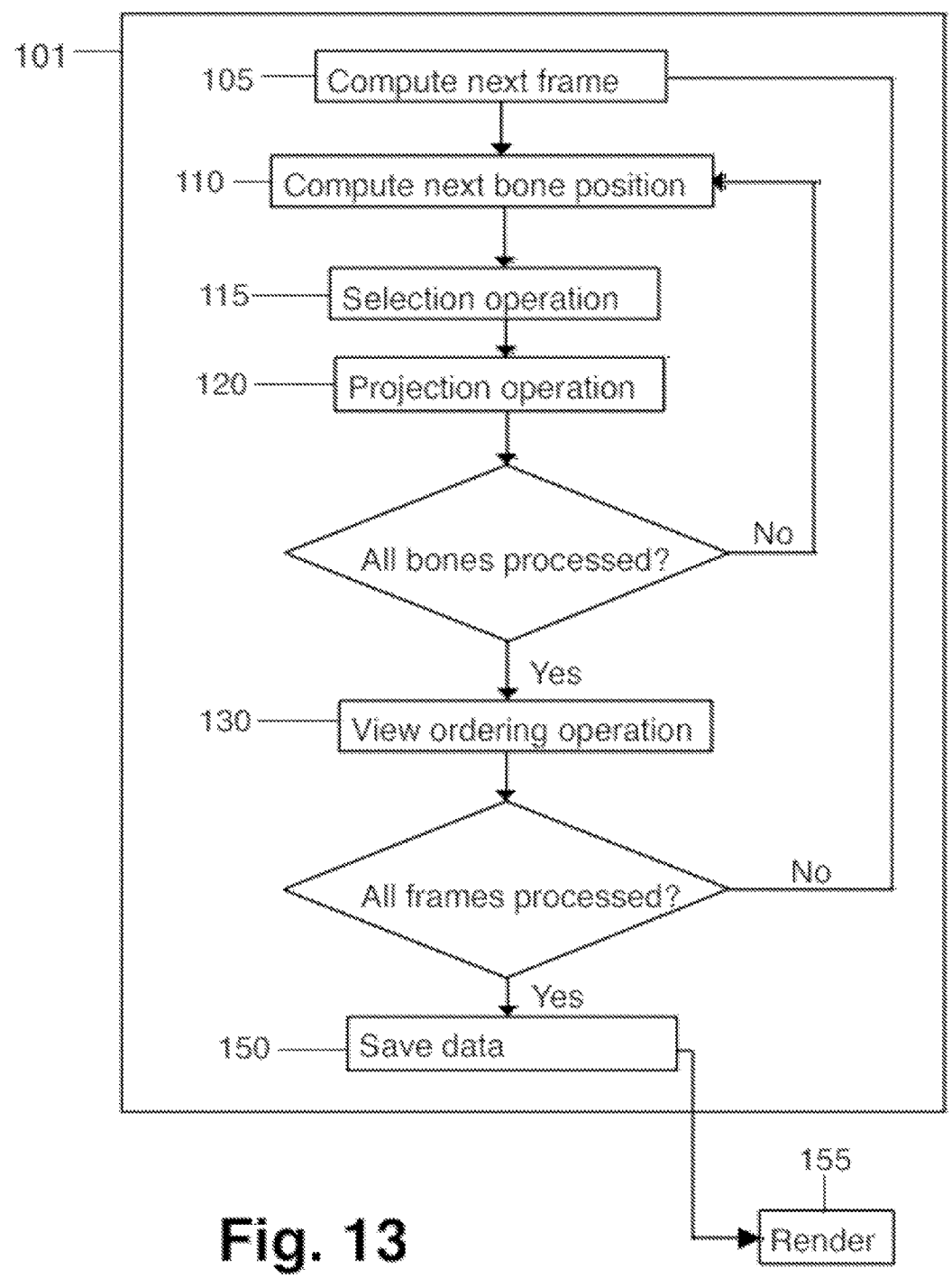

FIG. 13 shows how the production operation can be divided between two or more different software processes.

Figure 14:
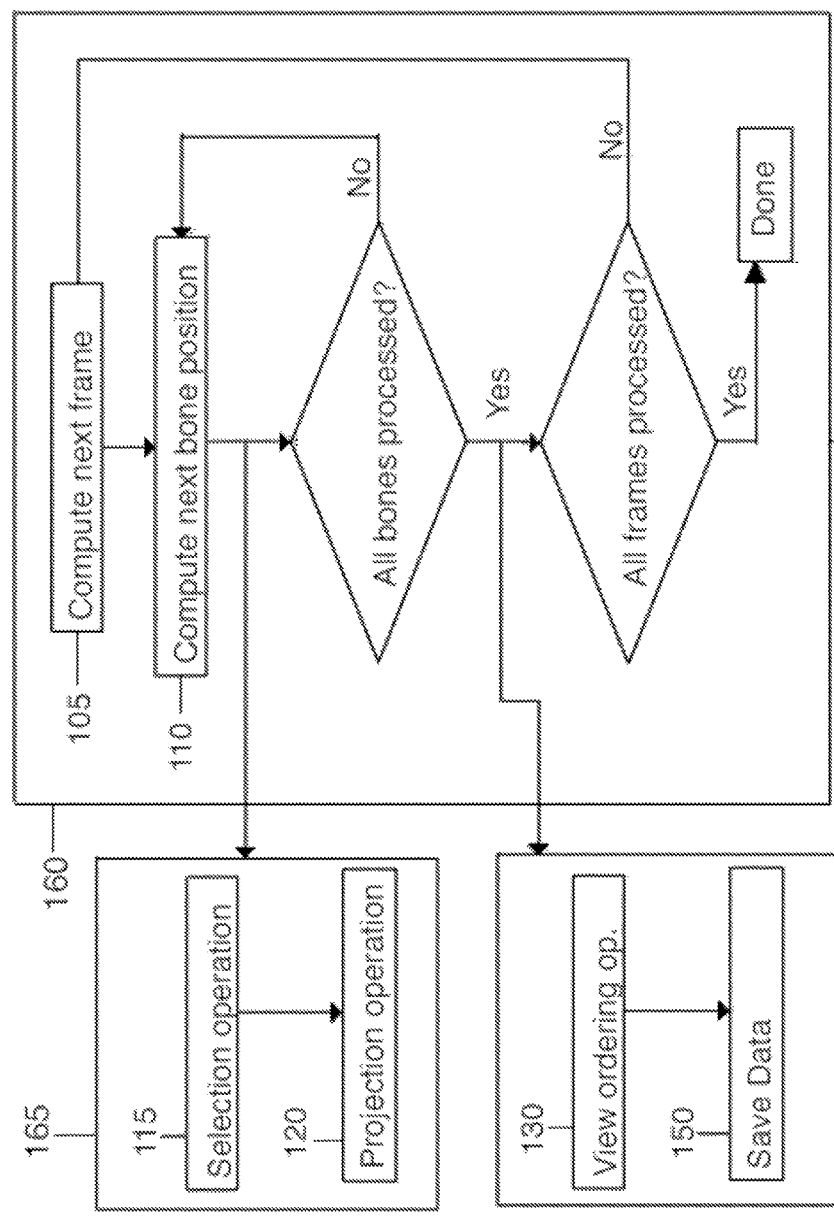

FIG. 14 shows how the production operation can be partially implemented as a set of software plug-ins that extend commercially available animation software programs.

DETAILED DESCRIPTION

First Embodiment

The first embodiment includes two primary operations: an asset creation operation in which an artist, animation producer, or other person produces various two-dimensional drawings or art assets representing the various body part segments of a two-dimensional character, and a production operation where calculations are performed on a 3D animated sequence, and in which the drawings or art asset produced in the asset creation operation are assembled to produce the final 2D animated character.

Figure 1:
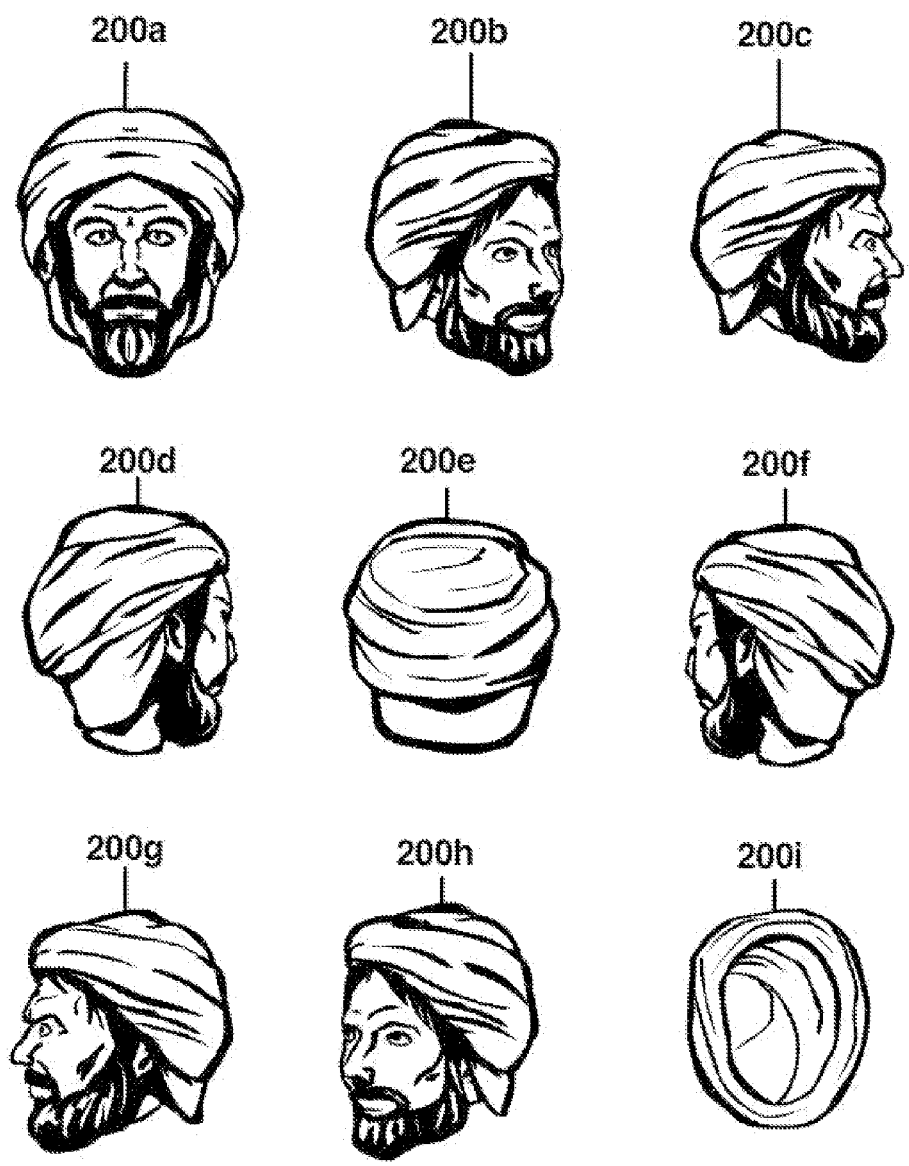
FIG. 1 shows a plurality of drawings or art assets representing the head of a 2D character.

Two-dimensional drawings as produced in the asset creation operation are shown in FIG. 1. An artist or animation producer will typically create these drawings using a two-dimensionally-oriented graphics-authoring program such as Adobe Illustrator, Photoshop, or the Flash CS5 authoring tool. These drawings will generally be stored as digital files and will usually take the form of either 2D vector graphic description files, or raster-graphic-oriented image files such as .bmp or .jpeg image files.

These drawings represent the body parts of the animated character as seen from various discreet viewing angles. FIG. 1 shows one embodiment in which there are nine different views of a human head as seen from nine discrete angles, a front view 200a, right ¾front view 200b, right side view 200c, right ¾back view 200d, back view 200e, right ¾ left view 200f, left side view 200g, left ¾front view 200h, and top view 200i. When the animated character is assembled in the production operation, the operation will select and use the one from among these nine drawings which best approximates the true position of the head of the animated character at any particular moment in time within the 3D animated sequence as it would be seen from the current position of the virtual camera in 3D space.

In the production operation, these drawings are scaled, rotated and placed on a 2D plane called the 2D rendering plane in an operation called the rendering operation in order to create a 2D animated character. Any number of views of a particular body part can be created to represent that particular body part in any particular embodiment. The number of views of a body part that are used is an implementation-specific consideration that reflects the desired fidelity of the output. The greater the number of views that are created and used, the greater the fidelity of the animated character will be and the smoother the animation will appear in the final 2D animated character.

Figure 2:
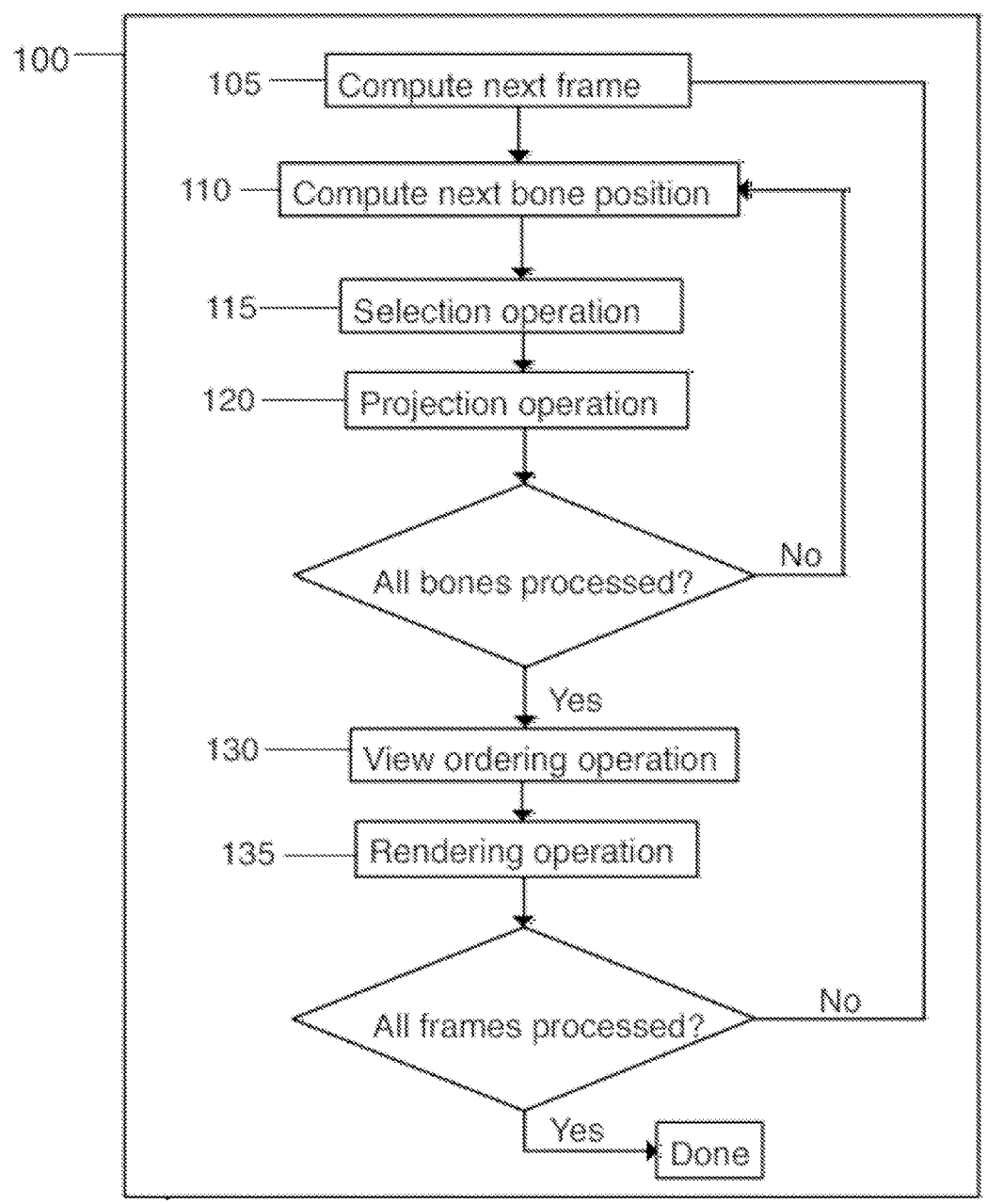
FIG. 2 shows a flowchart describing the sub-operations that comprise one embodiment of the production operation.

FIG. 2 shows a flowchart illustrating one embodiment of the production operation 100, which is performed by one or more software processes. The production operation analyzes a 3D animated sequence of a 3D armature and, for every frame of the animation (Compute next frame 105), determines the positioning and orientation of each bone of the armature in three-dimensional space (Compute next bone position 110). For every bone in the armature, then, the production operation performs a selection operation 115 which, based on the orientation of the bone in 3D space relative to a virtual camera, selects one particular view or 2D drawing of the body part corresponding to each bone to best represent that body part in the current frame of animation.

The production operation also performs a projection operation 120 in which the 3D endpoints of the bone are mathematically projected onto a two-dimensional plane, also called the view screen, using a virtual camera position in 3D space in a process that is referred to as 3D perspective projection operation. The purpose of the projection operation is to determine where, on each two-dimensional frame of the final 2D animated character sequence, the selected 2D drawing should be placed, and how it should be rotated and scaled. The process of 3D perspective projection is well understood in the computer graphics industry and will therefore not be given here.

Once all the bones have been processed for a given frame, a view ordering operation 130 is performed in order to determine the order in which to render the views or 2D drawings representing the various body parts into the 2D rendering plane for that particular frame in order to ensure that body parts that are closer the virtual camera are rendered after body parts that are farther away from the virtual camera. This is done so that body parts that appear to be closer to the viewer of the completed 2D animated sequence will appropriately occlude body parts that appear to be farther away from the viewer of the sequence. Once the order of the views is determined 130, then the views are rendered into the 2D rendering plane for the frame by the rendering operation 135.

Figure 3:
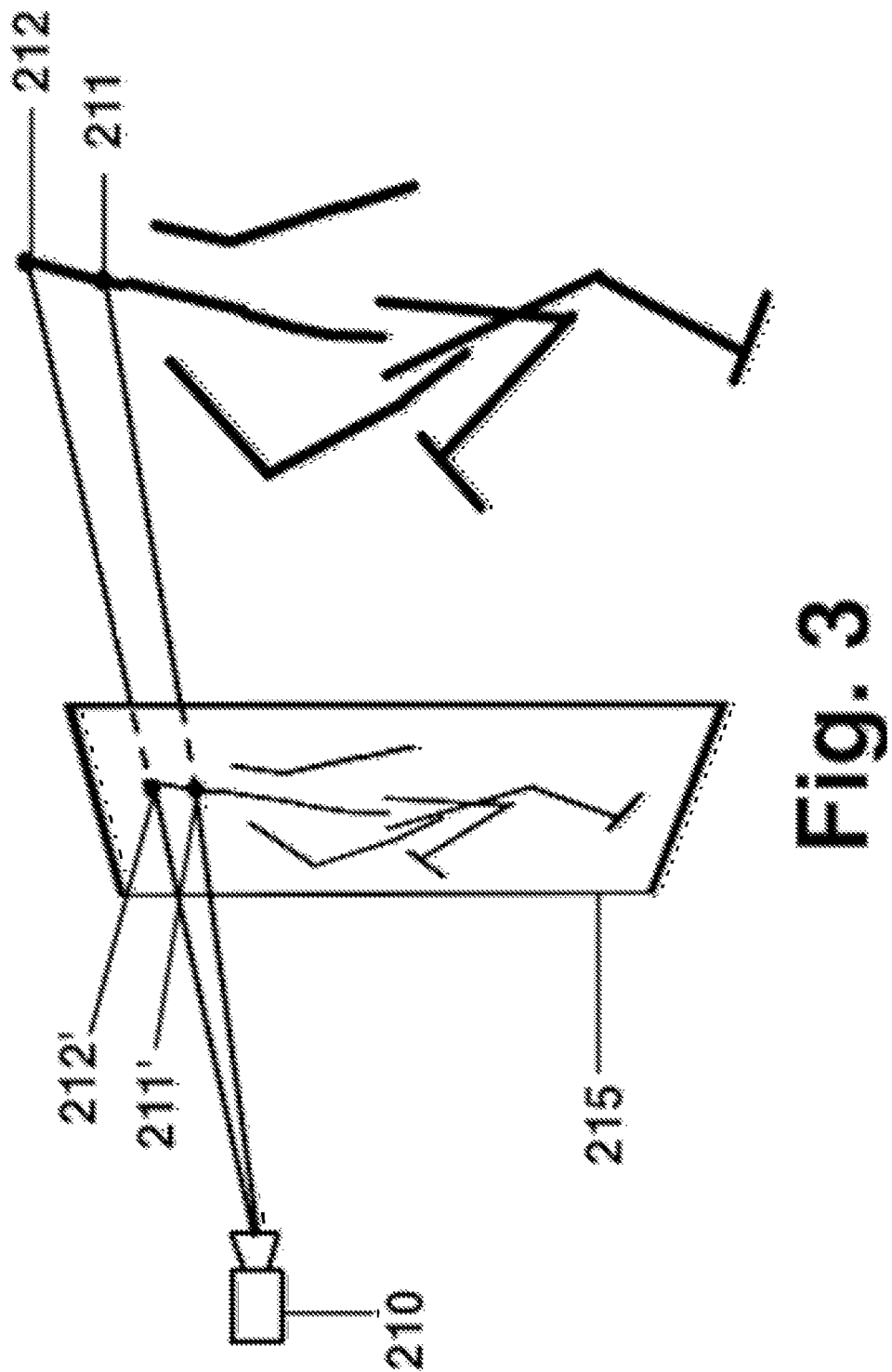
FIG. 3 shows how a bone in a 3D armature is projected onto a 2D plane using 3D perspective projection.

FIG. 3 shows how a bone in a 3D character armature is projected onto a plane in the projection operation using 3D perspective projection. The start endpoint 211 and the end endpoint 212 of the head bone of a 3D character armature in 3D space are projected onto a plane, or view screen 215 using a virtual camera in 3D space 210. The resulting line segment on the plane, defined by 2D points 211' and 212' on the view screen, define the placement, or projection, of the 3D bone onto the view screen. These 2D planar points, 211' and 212', are used to derive the 2D points that guide the process in the placement and scaling of a drawing representing the body part of the character, the head in the case shown, in the resulting 2D character animation for this particular frame of animation. Ultimately, for every frame of animation in the finished 2D character animation sequence, scaled drawings will be rendered into a 2D plane called the 2D rendering plane. The 2D rendering plane is a plane defined in using a two-dimensional coordinated system that correlates to the two-dimensional coordinate system of the view screen. In some embodiments, the 2D coordinates of the endpoints of a body segment in the 2D rendering plane are exactly the same as the coordinates of the corresponding projected points in the view screen with resulted from the 3D perspective projection operation 211' and 212'. In other embodiments, the endpoints of a body segment in the 2D rendering plane will be translated based on the position of the segment endpoints in the view plane 211' and 212' using a 2D x- and y-displacement value, and therefore, their 2D coordinates in the 2D rendering plane will not be the same as the 2D coordinates that they are derived from in the view screen.

Figure 4:
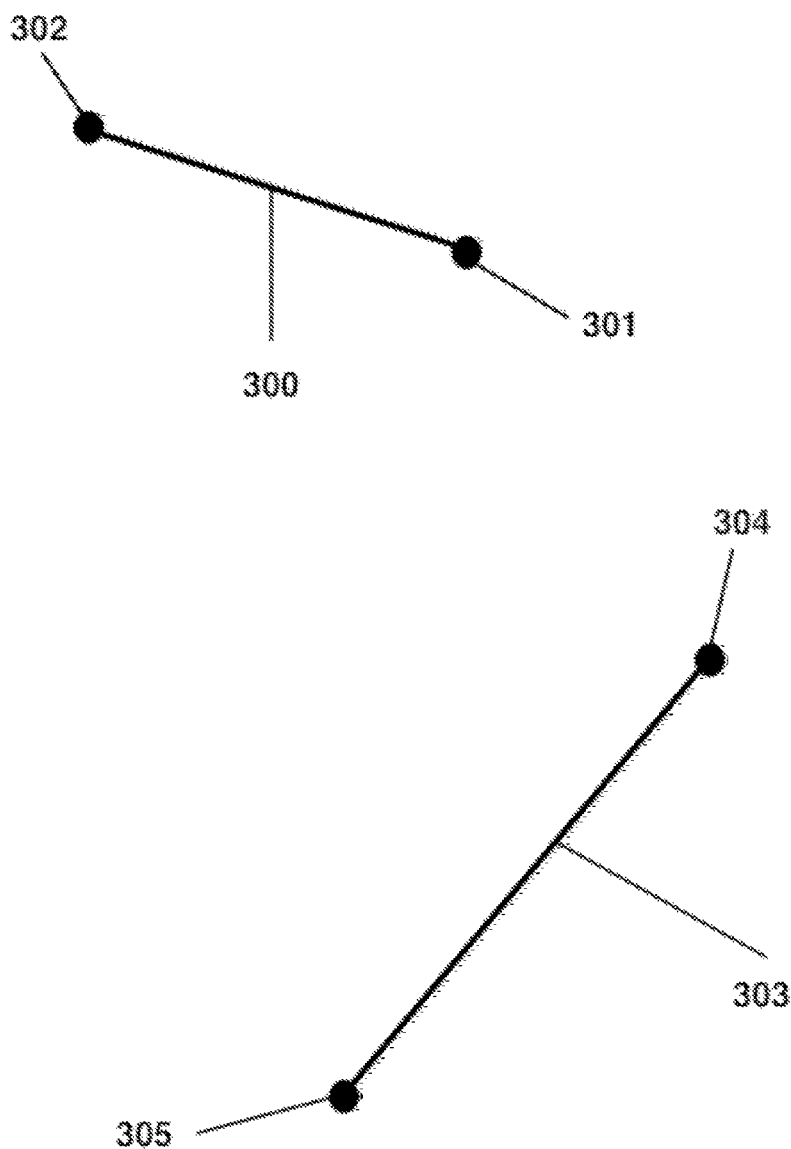
FIG. 4 shows two line segments each defined by two planar points in the 2D rendering plane.

FIG. 4 shows two line segments 300 and 303 in the 2D rendering plane, which have resulted from two bones that have been projected onto the viewing plane. Each line segment is defined by two planar points, and has a start endpoint and end endpoint in 2D space corresponding to the start endpoint and end endpoint of each bone in 3D space. The start endpoint of the first segment 300 is 301, and the end endpoint of the first segment 300 is 302. The start endpoint of the second segment 303 is 304, and the end endpoint of the second segment 303 is 305.

FIG. 5 shows how in one embodiment, views of a human foot 310a and 310b are rotated and scaled in 2D space in the 2D rendering plane based on the angle and length of the line segments 300 and 303, and placed in the plane such that the views have the same angle of rotation as the line segments that guides their placement. The views 310a and 310b are also scaled so that their lengths along the line segments 300 and 303 respectively correspond to the lengths of the segments. In one embodiment, the length of the body-part view will be somewhat longer than the length of the line segment that guides its placement, as is illustrated in the placement of the view of a human foot 310b as it is shown relative to line segments 303. In this case, the view of the foot 310b is scaled to be a little bit longer than the line segment 303, and is placed over line segment 303 such that the view of the foot 310b slightly overhangs both the start and the end of the line segment 303. The practice of scaling drawings so that they are slightly longer than the line segments that guide their placement and so they slightly overhang the start and end endpoints of the line segments that guide their placement is helpful in ensuring, when the completed animated character is rendered, that gaps between body parts do not appear in the finished animation.

Figure 6:
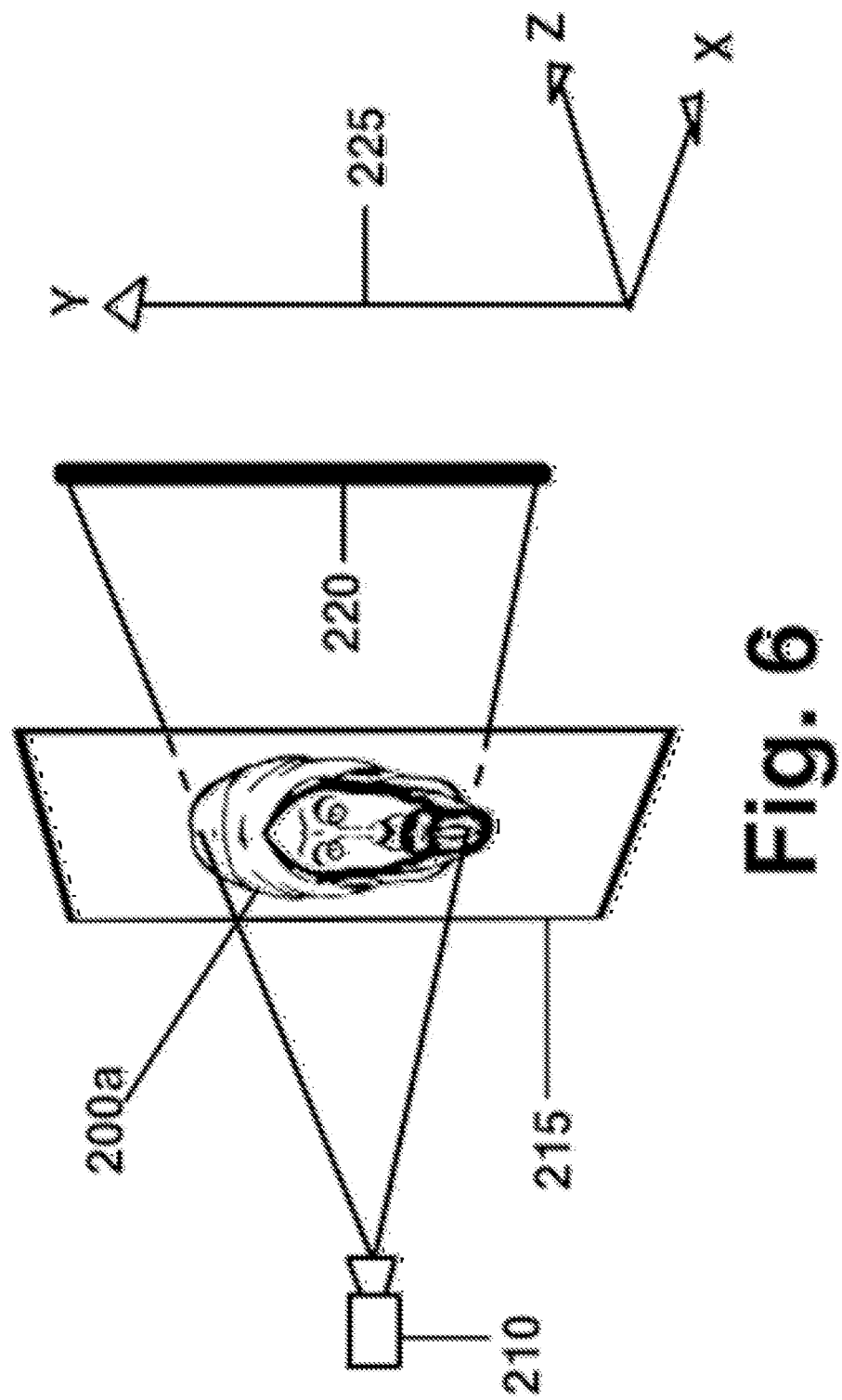
FIG. 6 shows how a drawing representing a view of the head of a 2D character is placed on a 2D plane based on the position of a 3D head bone in 3D space.

In addition to calculating these 2D planar points in the 2D render plane, which inform the software that executes the production operation where to place a drawing representing a particular body part in a particular frame of the resulting 2D character animation, the software must also determine which particular view of a given body part to select. FIG. 6 shows how one of the views of a human head that are pictured in FIG. 1 is selected for rendering. In FIG. 6, the head bone of a 3D armature 220 is oriented in 3D space such that the head is not seen as rotated to the left or right relative to the virtual camera 210, but appears instead to be directly facing the virtual camera 210. Because the head bone directly faces the camera, the front view 200a is selected to represent the head for that particular frame of animation. In FIG. 6, the head bone 220 happens to be exactly parallel to the y-axis 225 in three-dimensional space.

Figure 7A:
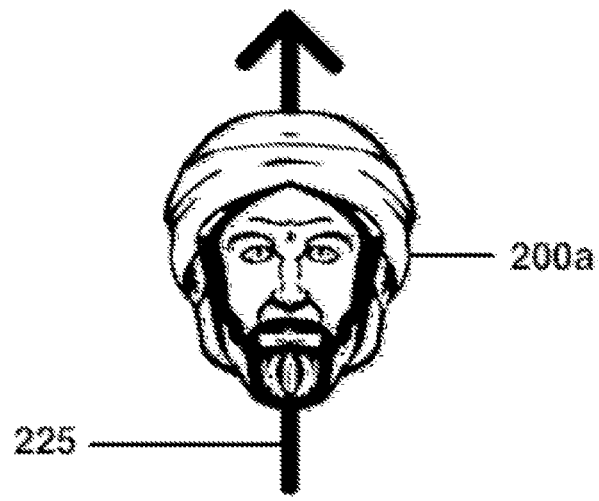
Figure 7B:
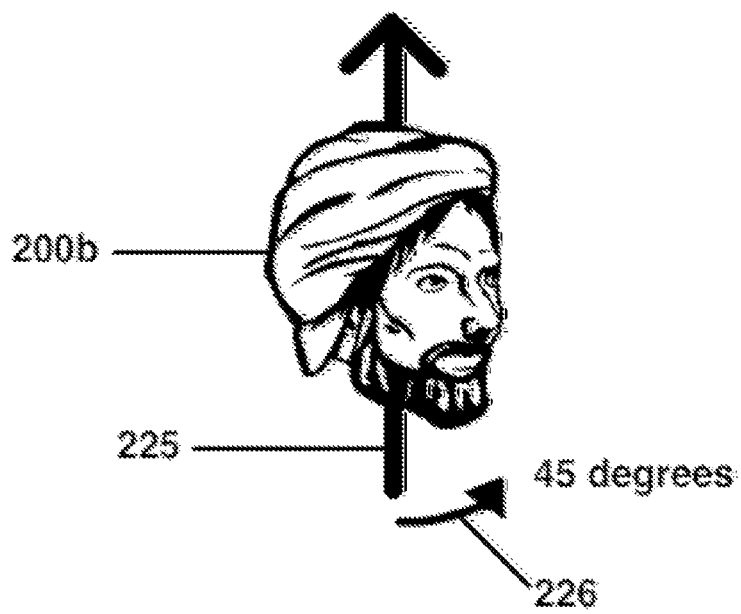
Figure 8A:
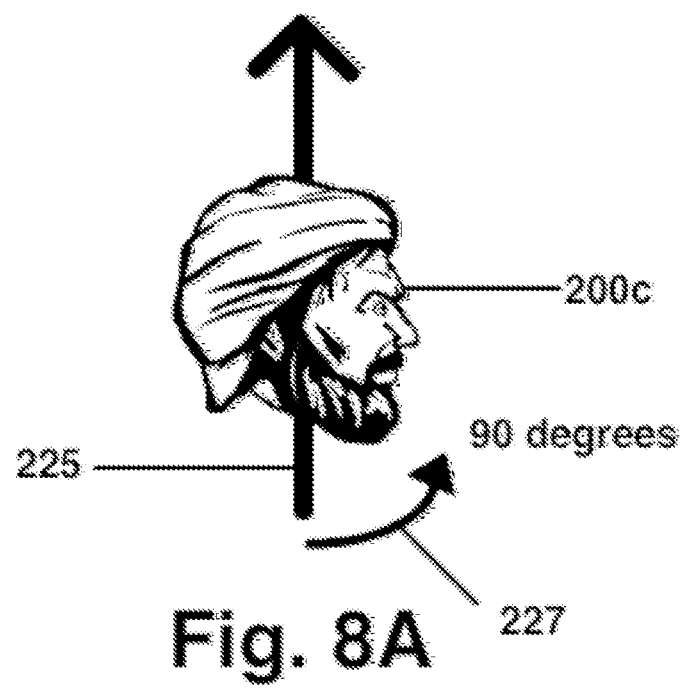

FIG. 7A is a conceptual drawing that shows the situation illustrated in FIG. 6 from the point of view of the virtual camera (not shown). In the embodiment under discussion, the rotation in degrees of the head bone around the y-axis 225 in 3D space is defined to be 0. If, as is shown in FIG. 7B, the head bone were to be rotated around the y-axis 45 degrees to the right, or clockwise 226, then the right ¾front view 200b is selected to represent the head, because that particular view represents the head as viewed from that particular angle. Likewise, FIG. 8A shows that the right view 200c is selected to represent the head if the head bone 220 is rotated 90 degrees 227 around the y-axis 225.

Figure 8B:
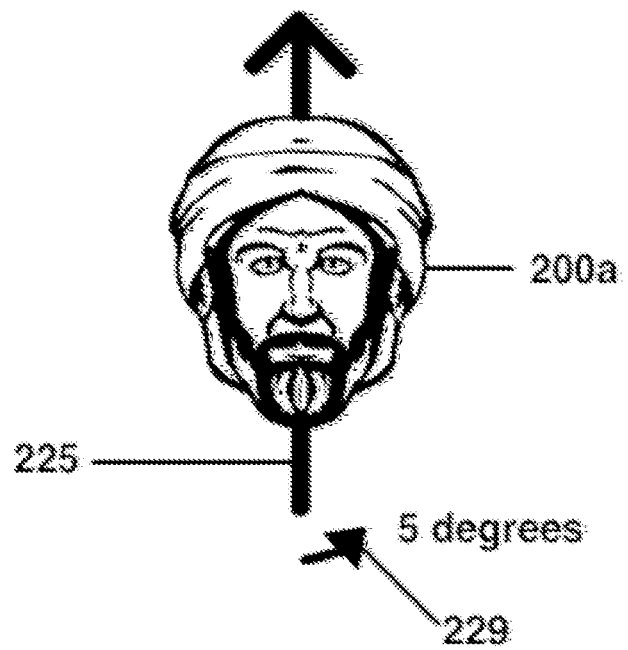

FIG. 8B illustrates how the selection operation selects the view that most closely approximates the ideal view, that is the view that would be selected based on the current position of the camera and the current rotation of a bone in the 3D armature if there were an infinite number of different views to choose from. In FIG. 8B, the head bone 220 is shown as rotated five degrees 229 around the y-axis 225. In this case, the ideal view of the head would be a drawing of the head that shows the head as it would look if it were rotated five degrees to the right. However, since the software must choose from among a finite set of existing head views, represented in this case in FIG. 1, such an ideal view does not exist, and the software must select the view that most closely approximates the ideal view, which, in this case, is the front view 200a.

In one embodiment, the selection operation can be executed algorithmically by rigging the 3D armature defining the character in 3D space with additional vertices, or points, herein referred to as control points, that are used in the production operation determine the current orientation of the bone relative to the virtual camera. FIG. 9 shows the head bone of a skeleton 220 with eight control points placed around the bone in 3D space 231 through 238. These points are rigged to the head bone 220 so that when the head bone moves or rotates in 3D space during the animation sequence, the control points move or rotate along with it.

In this embodiment, when the 3D perspective projection operation is performed, the camera is oriented such that it is pointed straight down the z-axis 223 in 3D character space, and from the camera's point of view, the x-axis 224 goes straight to the right and the y-axis 225 goes straight upwards. Referring to FIG. 9, if it is assumed that the head bone 220 of the animated character is facing exactly forward, then the four control points 231, 232, 233, and 234 will all have the same z-coordinate value, the z-axis 223 being the depth axis of the 3D space, and the plane defined by the control points 231, 232, 233, and 234 will be completely perpendicular to the z-axis 223.

According to one embodiment, the z-thickness of a plane is defined to be the difference between the lowest z-coordinate value of all the points in the plane and the highest z-coordinate value of all the points in the plane. If the head bone of the animated character is directly facing the camera, then, the z-thickness of the plane defined by control points 231, 232, 233, and 234 will be 0. However, if the head rotates at all, the points 231, 232, 233, and 234 will no longer have the same z-coordinate value and the z-thickness of the plane will no longer be 0.

The winding of a 2D closed polygon is determined based on whether the points of the polygon are arranged in a clockwise or counter-clockwise placement pattern. FIG. 10 shows two polygons 240 and 241. The top polygon 240 has a counter-clockwise winding because the points of the polygon 251, 252, 253 and 254 are arranged in a counter-clockwise placement pattern around the center of the polygon. The bottom polygon 241 has a clockwise winding because the points of the polygon 261, 262, 263 and 264 are arranged in a clockwise placement pattern around the center of the polygon 241. Programmatically determining the winding of a closed polygon is a well-known operation in computer graphics, so an algorithm for doing so will not be given.

This embodiment of the selection operation calculates the z-thickness and winding, clockwise or counter-clockwise, of various planes defined by various control points to determine which drawing to select to render any particular body part at any particular time. According to this embodiment, to determine the winding of a particular plane, a 3D plane is treated as a 2D plane by simply ignoring the Z-coordinate of every point in the plane, thereby treating the plane as a 2D polygon having only x and y dimensions.

Considering, then, the views of the human head shown in FIG. 1 200a through 200i, and the control points shown on FIG. 9 231 through 239, then, the selection of a view can be determined by considering the following five planes:
plane1=[control points 231, 232, 233, 234],
plane2=[control points 235, 231, 234, 238],
plane3=[control points 235, 232, 233, 238],
plane4=[control points 231, 236, 237, 234],
plane5=[control points 235, 231, 232, 236].

If the z-thickness of plane1 is less than that of the other planes, then, if the winding of plane1 is counter-clockwise, the front view 200a is used, and if the winding is clockwise, the back view 200e element is used.

If the z-thickness of plane2 is shorter than that of the other planes, then, if the winding of plane2 is counter-clockwise, the right view 200c is used, and if the winding is clockwise, the left view 200g is used.

If the z-thickness of plane3 is shorter than that of the other planes, then, if the winding of plane3 is counter-clockwise, the right ¾front view 200b is used, and if the winding is clockwise, the left ¾back view 200f is used.

If the z-thickness of plane4 is shorter than that of the other planes, then, if the winding of plane4 is counter-clockwise, the left ¾front view 200h is used, and if the winding is clockwise, the right ¾back view 200d is used.

And if the z-thickness of plane5 is shorter than that of the other planes, then, if the winding of plane5 is counter-clockwise, the top view 200i is used, and if the winding is clockwise, the bottom view (not shown) is used.

Generally, drawings are rendered into the 2D rendering plane with guidance from 2D planer points derived from a particular bone in 3D space as projected onto a view plane by the projection operation. However, in some embodiments, there are cases where for some views of some body parts, the 2D planar points derived from projection of the bone endpoints is not ideal for using to msap the placement of the views. In these cases, it is preferred to use a second bone perpendicular to the primary bone for a body part for 3D projection instead of using the primary bone for that body part.

FIG. 11 shows a human hand bone from a 3D armature 350 as projected onto the view screen 215 using a virtual camera 210. Based on the position of the bone 350 relative to the view screen 215, the selection algorithm picked a side view of the hand 351 to represent the hand in this particular frame. In this example, the planar points 360, 361 from the projected bone 350 are appropriate for guiding the placement of the view of the hand in the 2D rendering plane.

FIG. 12 shows a case where the hand bone 350 is placed perpendicularly from the view screen 215. In this case, a view of the hand facing frontward 352 is selected to represent the hand in this particular frame. In this example, if the bone were perfectly perpendicular to the view screen 215, then the planar points as projected by the hand bone 350 onto the view screen would both fall on the exact same point on the view screen, and would not define a line segment suitable for placing the view of the human hand. For this view, therefore, in one embodiment, instead of projecting the hand bone 350 onto the view screen 215, the production operation uses a second bone perpendicular to the hand bone 355 and projects that onto the view screen 215 instead, producing planar points 362 and 363 which are more appropriate for guiding the placement of the view of the hand 352 selected for this particular frame by the selection operation.

In one embodiment, the choice of which views should be mapped using a bone perpendicular to the primary bone for a body part and which should be mapped using the primary bone for a body part itself is hard-coded into lookup-tables in the software.

In one embodiment, when the body part views are rendered into the 2D rendering plane for any particular frame of animation, a view ordering operation is applied that will ensure that body parts that are farther away from the virtual camera that was used in the projection operation are rendered before body parts that were closer to the camera during the projection operation, because body parts that are closer to the camera should occlude body parts that are farther away.

In one embodiment, a z-depth-value for each bone is recording during the projection operation. The z-depth-value is defined to be the maximum z-coordinate, or depth-coordinate, value of both of the two endpoints of each bone in armature in 3D space. Once all the bones have been processed by the projection operation, the results are stored, and body-part views are sorted by their z-depth-value from greatest to least, and the graphical elements rendered in that order.

Additional Embodiments

In the first embodiment of the production operation, all of the sub-operations within the production operation occur within the context of a single software process running on a single computer. Such an embodiment might be a video gaming engine, or a 2D animation software production program.

FIG. 13 shows another embodiment, in which the production operation has been partitioned into two different software processes. In this diagram, some operations 101 have been moved into a preliminary software process, which performs the bulk of the calculations associated with the production operation, and stores the resulting data in an intermediate format such as XML, ASCII, or any other structured or unstructured form of data 150. This data is then consumed by a process 155 that runs independently, which performs the rendering operation. In this implementation, the preliminary software process 101 and the rendering software process 155 can be run on different computers at different times and in different locations. In one embodiment, the preliminary software process 101 might produce data that would reside on a server and be requested on-demand and consumed by a separate rendering process 155 running in a web browser.

FIG. 14 shows another embodiment wherein the some aspects of the production operation run within the context of a third-party animation program 160. Many third-party animation programs, like Autodesk's Maya or 3ds Max, or Blender, allow users to write custom scripts or software plug-ins that perform various software tasks within the context of the animation program. In this embodiment, the animation program would be responsible for animating the armature using various animation sequences, and the animation program would invoke custom scripts or plug-ins 165 and 170 at various points in the process that would perform the projection operation 115, the selection operation 120, and the View ordering operation 130. The plug-ins would also be responsible for exporting data 150 that would be consumed by a separate rendering process (not shown) to produce the finished 2D character animation sequence.

Scope

The disclosure and various features and advantageous details thereof are explained more fully with reference to the exemplary, and therefore non-limiting, embodiments illustrated in the accompanying drawings and detailed in the preceding or following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, or refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

What is claimed is:

1. A method for producing a 2D animated character sequence comprising:
   a. producing a set of 2D drawings or art assets that represent one or more views of each body part of the character being represented,
   b. performing a computer-implemented production operation to produce multiple frames of said 2D animated character sequence by analyzing a 3D animated sequence of a 3D armature comprised of primary bones in order to determine the motion, position, and orientation of said primary bones of said armature in 3D space over time using a specific virtual camera location in 3D space, said analysis step being carried out for each said primary bone in said 3D armature at each particular moment in time or frame of a 2D animated character sequence, and rendering each 2D frame in said 2D animated character sequence to produce a sequence of frames comprising said 2D animated character sequence, said production operation comprising the following steps,
      Step 1. for a primary bone in said 3D armature, performing a computer-implemented selection operation to determine which of a collection of 2D drawings of a body part produced in (a) corresponding to said primary bone in said 3D armature to use to best represent said body part corresponding to said primary bone of said armature being analyzed as viewed from said virtual camera in 3D space at said particular moment in time during said 2D animated character sequence, and repeating this computer-implemented selection process for each said primary bone in said 3D armature for each particular moment of time during said 2D animated character sequence,
      Step 2. performing a computer-implemented projection operation for said primary bone of said armature being analyzed in order to determine where, on a 2D plane, the 2D drawing representing said body part corresponding to said primary bone being analyzed should be placed, rotated and scaled at said particular moment in time during said 2D animated character sequence, and repeating said computer-implemented projection for each said primary bone in said 3D armature for each particular moment in time in said 2D animated character sequence, and
      Step 3. performing a computer-implemented ordering operation to determine an order in which to render said 2D drawings comprising the frames of said 2D animated character sequence in order to ensure that body parts that are closer to said virtual camera are rendered after body parts that are further away from said virtual camera, and
      Step 4. for each said moment in time of said 2D character animated sequence, in a computer-implemented process, rendering all said body part drawings selected in step 1 representing said primary bones in said 3D armature in a rendering plane according to the placement, rotation and scaling information derived in step 2 and the ordering information derived in step 3 so as to generate a frame in said 2D animated character sequence, and repeating said rendering process for each moment in time in said 2D animated character sequence so as to produce a sequence of frames comprising said 2D animated character sequence.

2. The method of claim 1, wherein the projection operation is implemented using 3D perspective projection.

3. The method of claim 1, further comprising adding an additional set of secondary bones to the 3D armature, each of which are placed perpendicularly to said primary bones for each body part of said armature, and which are used, in conjunction with certain drawings representing a particular body part, in the projection operation in order to determine where, on a 2D plane, the 2D drawings should be placed, rotated and scaled at each particular point in time in the 2D animated character sequence.

4. The method of claim 1, further comprising rigging a set of control points to various ones of said primary bones in said 3D armature, and using said control points in the selection operation to determine which particular 2D drawing representing the body part corresponding to said primary bone to use to best represent that particular body part at each particular moment in time in the 2D animated character sequence.

5. The method of claim 1, wherein the production operation is performed by a single computer process including a process carried out by a video gaming engine.

6. The method of claim 1, wherein the production operation is divided into 2 or more separate software processes.

7. The method of claim 1, wherein the production operation is performed in part by a third-party animation software program in conjunction with a set of one or more software plug-ins that are invoked by the third-party animation software program, and that perform some of the operations that comprise the production operation.

8. A non-transitory computer-readable storage medium having stored thereon computer-readable instructions that were either encoded into said storage medium by a software manufacturer or were transmitted to a computer over the internet or an data path and written by said computer onto a tangible computer-readable storage medium, said instructions, when executed by a computer, cause the computer to create a 2D animated character sequence by performing a production operation to produce multiple frames of said 2D animated character sequence by analyzing a 3D animated sequence of a 3D armature comprised of primary bones in order to determine the motion, position, and orientation of said primary bones of said armature in 3D space over time using a specific virtual camera location in 3D space, said analysis step being carried out for each said primary bone in said 3D armature at each particular moment in time or frame of a 2D animated character sequence, and rendering each 2D frame in said 2D animated character sequence to produce a sequence of frames comprising said 2D animated character sequence, said production operation comprising the following steps, Step 1. for a primary bone in said 3D armature, performing a selection operation to determine which of a collection of 2D drawings prepared in advance of a body part corresponding to said primary bone in said 3D armature to use to best re resent said bode art corresponding to said primary bone of said armature being analyzed as viewed from said virtual camera in 3D space at said particular moment in time during said 2D animated character sequence, and repeating this selection process for each said primary bone in said 3D armature for each particular moment of time during said 2D animated character sequence, Step 2. performing a projection operation for said primary bone of said armature being analyzed in order to determine where, on a 2D plane, the 2D drawing representing said body part corresponding to said primary bone being anal zed should be placed, rotated and scaled at said particular moment in time during said 2D animated character sequence, and repeating said computer-implemented projection for each said primary bone in said 3D armature for each particular moment in time in said 2D animated character sequence, Step 3. performing an ordering operation to determine an order in which to render said 2D drawings comprising the frames of said 2D animated character sequence in order to ensure that body parts that are closer to said virtual camera are rendered after body parts that are further away from said virtual camera, and Step 4. for each said moment in time of said 2D character animated sequence, rendering all said body part drawings selected in step 1 representing said primary bones in said 3D armature in a rendering plane according to the placement, rotation and scaling information derived in step 2 and the ordering information derived in step 3 so as to generate a frame in said 2D animated character sequence, and repeating said rendering process for each moment in time in said 2D animated character sequence so as to produce a sequence of frames comprising said 2D animated character sequence.

9. The computer-readable storage medium of claim 8, wherein the projection operation achieved using 3D perspective projection.

10. The computer-readable storage medium of claim 8, wherein said projection operation is performed using, in selected cases, an additional set of secondary bones in said 3D armature, each of which are placed perpendicularly to said primary bones for each said body part corresponding to a primary bone of said armature.

11. The computer-readable storage medium of claim 8, wherein the projection operation is performed using a set of control points which are rigged to various bones in 3D armature.

12. The computer-readable storage medium of claim 8, wherein the stored instructions are stored on 2 or more separate computers, and which are executed as two or more separate software processes.

13. The computer-readable storage medium of claim 8, wherein the execution of stored instruction is performed in part by a third-party animation software program in conjunction with a set of one or more software plug-ins that are invoked by the third-party animation software program.

14. An apparatus for producing a 2D animated character sequence comprising: a computer having memory and a processor and having user interface peripherals including a display, a keyboard and a pointing device, and programmed with an operating system and one or more application programs which cooperate to control said computer to perform the following functions:

a. loading a set of 2D drawings or art assets that re-resent one or more views of each body part of said character being represented into memory of said computer, b. performing a computer-implemented production operation which analyzes a 3D animated sequence of a 3D armature comprised of primary bones in order to determine the motion, position, and orientation of said primary of said armature in 3D space over time using a specific virtual camera location in 3D space, said analysis step being carried out for each said primary bone in said 3D armature at each particular moment in time of said 2D animated character sequence and rendering to produce a sequence of frames comprising said 2D animated character sequence, said production operation comprising the following steps, Step 1. performing a computer-implemented selection operation to determine which particular 2D drawing of a body part loaded in (a) corresponds to said primary bone in said 3D armature to use to best represent said body part corresponding to said primary bone of said armature being analyzed as viewed from said virtual camera in 3D space at said particular moment in time during said 2D animated character sequence, and repeating this computer-implemented selection process for each said primary bone in said 3D armature for each particular moment of time during said 2D animated character sequence, Step 2. performing a computer-implemented projection operation for said primary bone of said armature being analyzed in order to determine where, on a 2D plane, the 2D drawing selected in step 1 representing said body part corresponding to said primary bone being analyzed should be placed, rotated and scaled at said particular moment in time during said 20 animated character sequence, and repeating said computer-implemented projection operation for each said primary bone in said 3D armature for each particular moment in time in said 2D animated character sequence, and Step 3. determining an order in which to render said 2D drawings comprising the frames of said 2D animated character sequence in order to ensure that body parts that are closer to said virtual camera are rendered after body parts that are further away from said virtual camera, and Step 4. rendering all said body part drawings selected in step 1 representing said primary bones in said 3D armature in a rendering plane according to the placement, rotation and scaling information derived in step 2 and the ordering information derived in step 3 to generate a frame in said 2D animated character sequence and rendering said frames in said order determined in this step 4 so as to produce a sequence of frames comprising said 2D animated character sequence.

\* \* \* \* \*